US 11,641,647 B2

(12) United States Patent
Zhang et al.

(10) Patent No.: US 11,641,647 B2
(45) Date of Patent: May 2, 2023

(54) PER-PHYSICAL CELL IDENTIFIER CONFIGURATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/248,023

(22) Filed: Jan. 5, 2021

(65) Prior Publication Data

US 2021/0227533 A1 Jul. 22, 2021

Related U.S. Application Data

(60) Provisional application No. 62/962,546, filed on Jan. 17, 2020.

(51) Int. Cl.
*H04W 24/10* (2009.01)
*H04W 72/04* (2023.01)
*H04W 74/08* (2009.01)
*H04W 56/00* (2009.01)

(52) U.S. Cl.
CPC ....... *H04W 72/0406* (2013.01); *H04W 24/10* (2013.01); *H04W 56/00* (2013.01); *H04W 74/0833* (2013.01)

(58) Field of Classification Search
CPC .. H04L 12/28; H04W 72/0406; H04W 24/10; H04W 56/00; H04W 74/0833
USPC ......................................... 370/329
See application file for complete search history.

(56) References Cited

U.S. PATENT DOCUMENTS

| 2014/0212129 | A1 | 7/2014 | Huang et al. |
| 2014/0335859 | A1 | 11/2014 | Hahn et al. |
| 2018/0234145 | A1 | 8/2018 | Onggosanusi et al. |
| 2022/0078735 | A1* | 3/2022 | Saggar .............. H04W 56/0005 |

OTHER PUBLICATIONS

International Search Report and Written Opinion—PCT/US2021/070006—ISA/EPO—dated Apr. 30, 2021.

(Continued)

*Primary Examiner* — Dang T Ton
(74) *Attorney, Agent, or Firm* — Qualcomm Incorporated

(57) ABSTRACT

Various aspects of the present disclosure generally relate to wireless communication. In some aspects, a user equipment (UE) may receive a plurality of configurations corresponding to a plurality of physical cell identifiers (PCIs), wherein the plurality of PCIs are associated with a serving cell of a base station, and wherein the plurality of configurations are based at least in part on respective remote radio heads (RRHs) of the base station; receive information indicating an RRH, of the respective RRHs, or a PCI corresponding to the RRH; and perform a communication with the RRH based at least in part on the PCI in accordance with a configuration, of the plurality of configurations, corresponding to the PCI. Numerous other aspects are provided.

29 Claims, 5 Drawing Sheets

(56) References Cited

OTHER PUBLICATIONS

Mediatek Inc: "Point Selection and CSI Feedback for CoMP Operation", 3GPP TSG-RAN WG1 #66bis, 3GPP Draft; R1-113051 CSI Measurement Feedback Comp R2, 3rd Generation Partnership Project—(3GPP), Mobile Competence Centre; 650, Route Des Lucioles; F-06921 Sophia-Antipolis Cedex; France, vol. RAN WG1, No. Zhuhai; Oct. 10, 2011-Oct. 14, 2011, 4 Pages, Oct. 4, 2011 (Oct. 4, 2011), XP050538210, [retrieved on Oct. 4, 2011] paragraphs [001.], [003.], [004.].

* cited by examiner

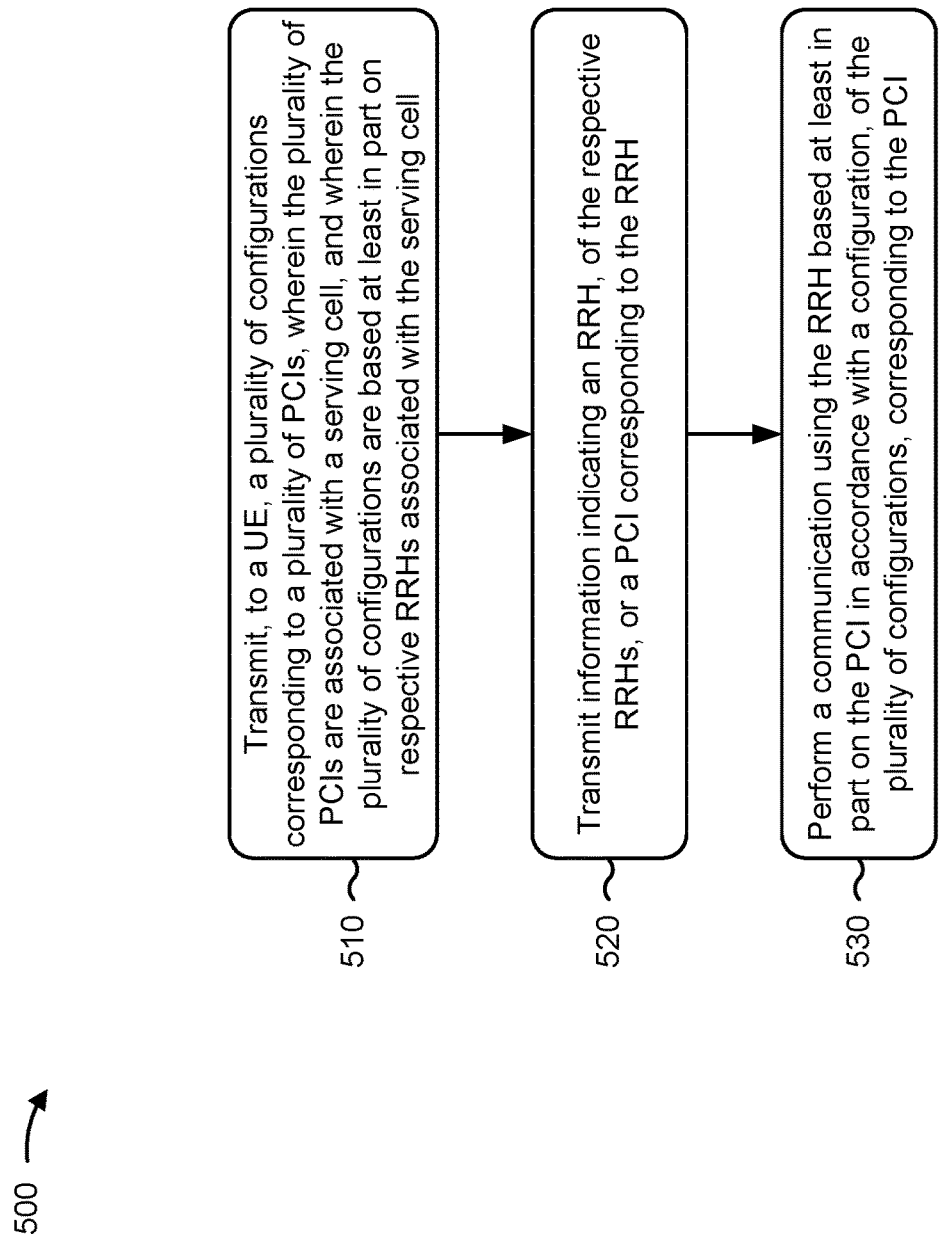

PER-PHYSICAL CELL IDENTIFIER CONFIGURATION

CROSS-REFERENCE TO RELATED APPLICATION

This Patent Application claims priority to U.S. Provisional patent Application No. 62/962,546, filed on Jan. 17, 2020, entitled "PER-PHYSICAL CELL IDENTIFIER CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for per physical cell identifier (per-PCI) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a plurality of configurations corresponding to a plurality of physical cell identifiers (PCIs), wherein the plurality of PCIs are associated with a serving cell of a base station, and wherein the plurality of configurations are based at least in part on respective remote radio heads (RRHs) of the base station; receiving information indicating an RRH, of the respective RRHs, or a PCI corresponding to the RRH; and performing a communication with the RRH based at least in part on the PCI in accordance with a configuration, of the plurality of configurations, corresponding to the PCI.

In some aspects, a method of wireless communication, performed by a base station, may include transmitting, to a UE, a plurality of configurations corresponding to a plurality of PCIs, wherein the plurality of PCIs are associated with a serving cell, and wherein the plurality of configurations are based at least in part on respective RRHs associated with the serving cell; transmitting information indicating an RRH, of the respective RRHs, or a PCI corresponding to the RRH; and performing a communication using the RRH based at least in part on the PCI in accordance with a configuration, of the plurality of configurations, corresponding to the PCI.

In some aspects, a UE for wireless communication may include a memory and one or more processors operatively coupled to the memory. The memory and the one or more processors may be configured to receive a plurality of configurations corresponding to a plurality of PCIs, wherein the plurality of PCIs are associated with a serving cell of a base station, and wherein the plurality of configurations are based at least in part on respective RRHs of the base station; receive information indicating an RRH, of the respective RRHs, or a PCI corresponding to the RRH; and perform a communication with the RRH based at least in part on the PCI in accordance with a configuration, of the plurality of configurations, corresponding to the PCI.

In some aspects, a base station for wireless communication may include a memory and one or more processors operatively coupled to the memory. The memory and the one or more processors may be configured to transmit, to a UE, a plurality of configurations corresponding to a plurality of PCIs, wherein the plurality of PCIs are associated with a serving cell, and wherein the plurality of configurations are based at least in part on respective RRHs associated with the serving cell; transmit information indicating an RRH, of the respective RRHs, or a PCI corresponding to the RRH; and perform a communication using the RRH based at least in part on the PCI in accordance with a configuration, of the plurality of configurations, corresponding to the PCI.

In some aspects, a non-transitory computer-readable medium may store one or more instructions for wireless communication. The one or more instructions, when executed by one or more processors of a UE, may cause the one or more processors to receive a plurality of configurations corresponding to a plurality of PCIs, wherein the plurality of PCIs are associated with a serving cell of a base station, and wherein the plurality of configurations are based at least in part on respective RRHs of the base station;

receive information indicating an RRH, of the respective RRHs, or a PCI corresponding to the RRH; and perform a communication with the RRH based at least in part on the PCI in accordance with a configuration, of the plurality of configurations, corresponding to the PCI.

In some aspects, a non-transitory computer-readable medium may store one or more instructions for wireless communication. The one or more instructions, when executed by one or more processors of a base station, may cause the one or more processors to transmit, to a UE, a plurality of configurations corresponding to a plurality of PCIs, wherein the plurality of PCIs are associated with a serving cell, and wherein the plurality of configurations are based at least in part on respective RRHs associated with the serving cell; transmit information indicating an RRH, of the respective RRHs, or a PCI corresponding to the RRH; and perform a communication using the RRH based at least in part on the PCI in accordance with a configuration, of the plurality of configurations, corresponding to the PCI.

In some aspects, an apparatus for wireless communication may include means for receiving a plurality of configurations corresponding to a plurality of PCIs, wherein the plurality of PCIs are associated with a serving cell of a base station, and wherein the plurality of configurations are based at least in part on respective RRHs of the base station; means for receiving information indicating an RRH, of the respective RRHs, or a PCI corresponding to the RRH; and means for performing a communication with the RRH based at least in part on the PCI in accordance with a configuration, of the plurality of configurations, corresponding to the PCI.

In some aspects, an apparatus for wireless communication may include means for transmitting, to a UE, a plurality of configurations corresponding to a plurality of PCIs, wherein the plurality of PCIs are associated with a serving cell, and wherein the plurality of configurations are based at least in part on respective RRHs associated with the serving cell; means for transmitting information indicating an RRH, of the respective RRHs, or a PCI corresponding to the RRH; and means for performing a communication using the RRH based at least in part on the PCI in accordance with a configuration, of the plurality of configurations, corresponding to the PCI.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
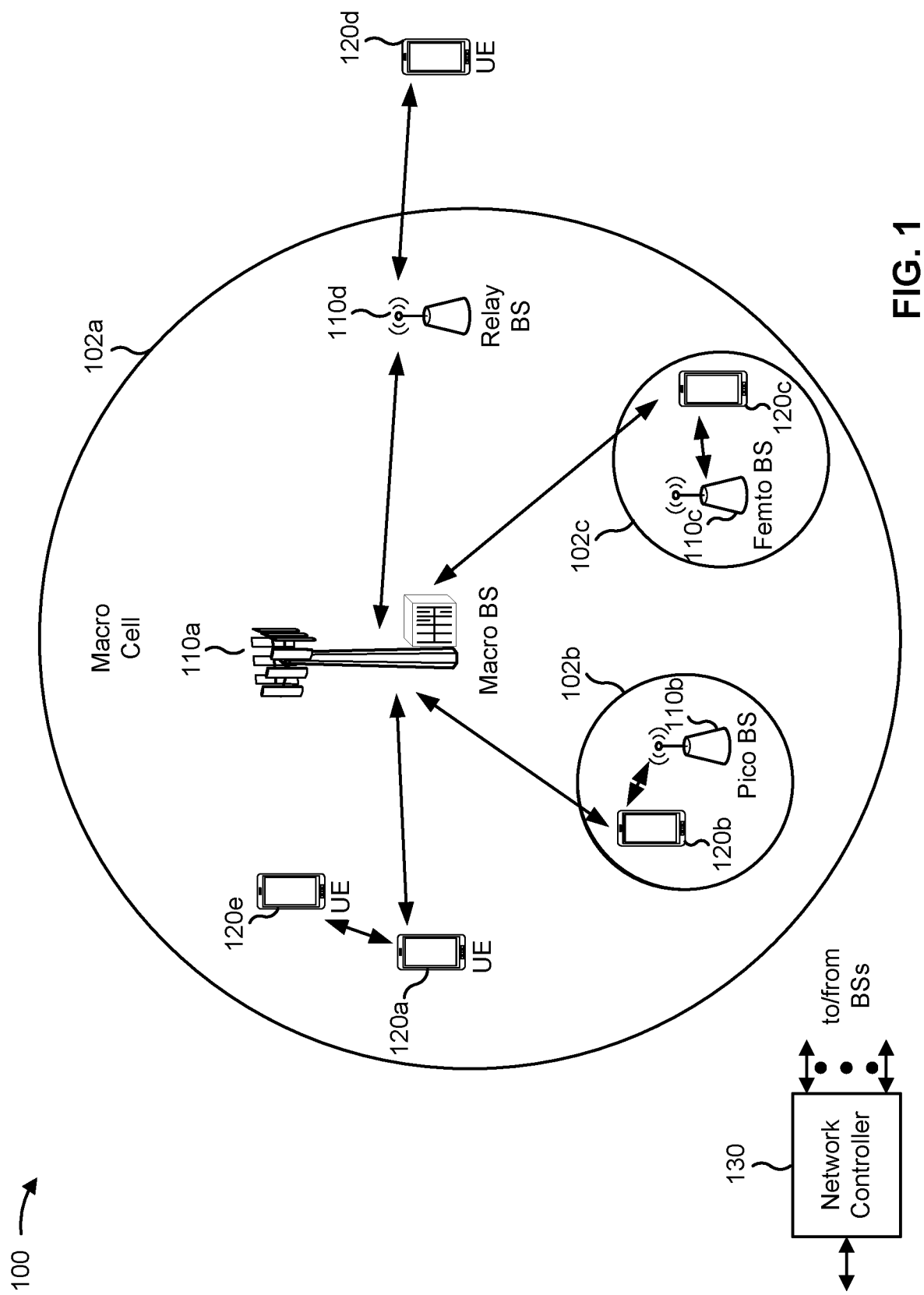
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
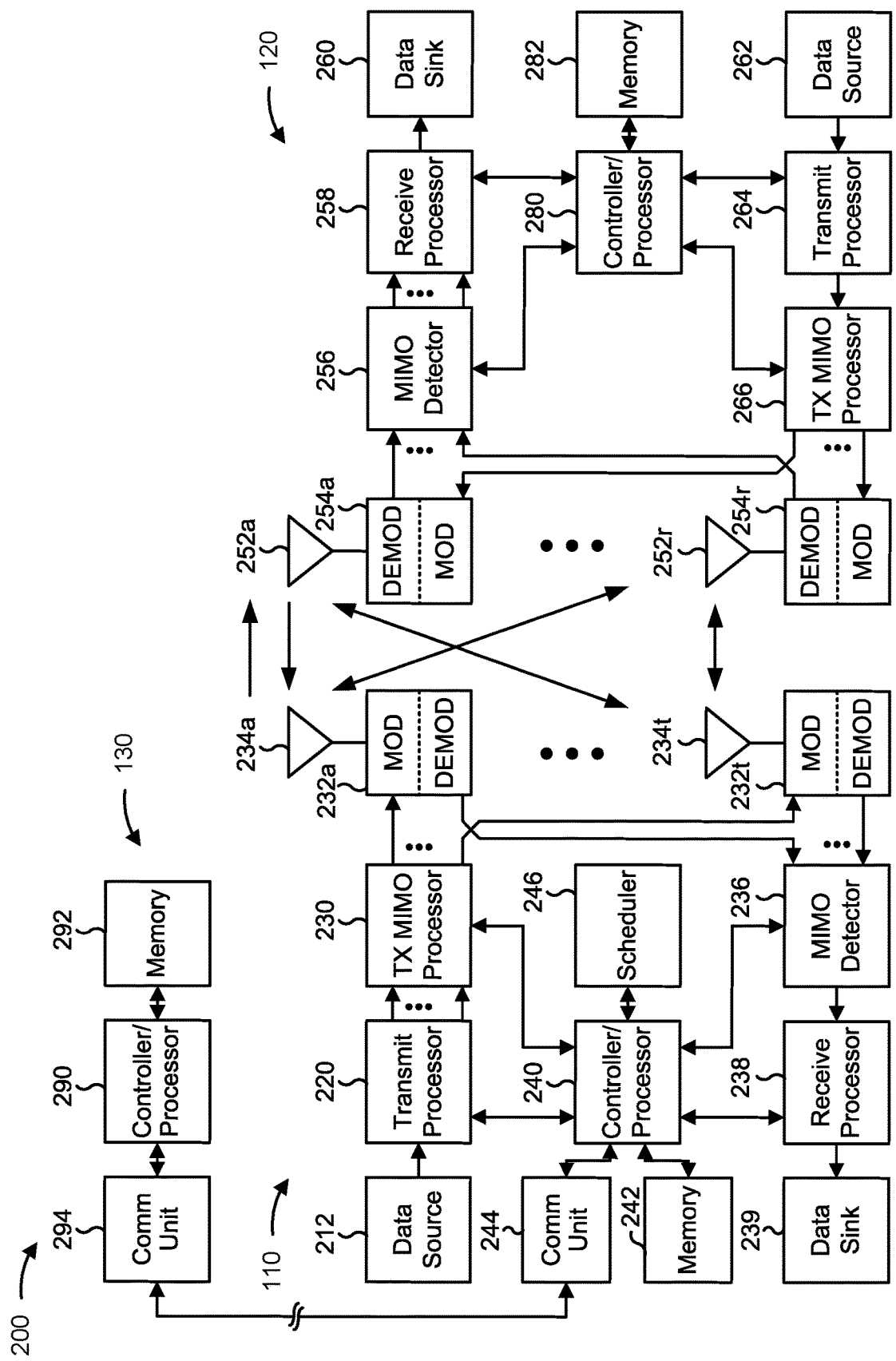
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with per-physical cell identifier (per-PCI) configuration of a plurality of remote radio heads (RRHs), as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving a plurality of configurations corresponding to a plurality of PCIs, wherein the plurality of PCIs are associated with a serving cell of a base station, and wherein the plurality of configurations are based at least in part on respective remote radio heads (RRHs) of the base station; means for receiving information indicating an RRH, of the respective RRHs, or a PCI corresponding to the RRH; means for performing a communication with the RRH based at least in part on the PCI in accordance with a configuration, of the plurality of configurations, corresponding to the PCI; means for receiving one or more synchronization signal blocks from the RRH based at least in part on the configuration; means for reporting a measurement based at least in part on the one or more synchronization signal blocks wherein the information indicating the RRH is based at least in part on the measurement; means for performing a radio link monitoring operation or a beam failure recovery operation for all PCIs of the plurality of PCIs based at least in part on the plurality of configurations; means for performing a radio link monitoring operation or a beam failure recovery operation for a proper subset of the plurality of PCIs based at least in part on the plurality of configurations; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a plurality of configurations corresponding to a plurality of PCIs, wherein the plurality of PCIs are associated with a serving cell, and wherein the plurality of configurations are based at least in part on respective RRHs associated with the serving cell; means for transmitting information indicating an RRH, of the respective RRHs, or a PCI corresponding to the RRH; means for performing a communication using the RRH based at least in part on the PCI in accordance with a configuration, of the plurality of configurations, corresponding to the PCI; means for transmitting respective synchronization signal blocks from the respective RRHs based at least in part on the plurality of configurations; means for receiving information indicating one or more measurements based at least in part on the respective synchronization signal blocks; means for selecting the RRH or the PCI based at least in part on the information indicating the one or more measurements; means for transmitting the information indicating the RRH based at least in part on selecting the RRH or the PCI; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some deployments, a base station such as a gNB may be associated with multiple RRHs. An RRH, also referred to as a remote radio unit (RRU), is a remote radio transceiver (e.g., remote relative to the gNB). RRHs may extend coverage of the base station in challenging environments such as rural areas, buildings, and tunnels. In some cases, a base station may provide a cell that is associated with a PCI. In the case when the base station is associated with multiple RRHs, a serving cell provided by the base station may be configured with multiple PCI, and the multiple RRHs may each have a respective PCIs. Thus, each RRH can use a respective PCI and can transmit a full set of synchronization signal block (SSB) identifiers of the base station or the serving cell. Then, DCI or a medium access control control element (MAC-CE) can select which RRH(s) or corresponding PCI(s) are to serve a UE based at least in part on an SSB reference signal received power (RSRP) report.

However, when the base station is associated with a plurality of RRHs that have corresponding PCIs, configuring of the plurality of RRHs may be problematic. For example, if PCIs of all of the RRHs are configured in accordance with a serving cell configuration (e.g., a cell-wide configuration), then the base station may perform sub-optimally, since different RRHs may be associated with different radio frequency characteristics, hardware configurations, locations, and so on. Furthermore, individual RRHs may be associated with certain characteristics which a macro cell is not associated with, such as certain spatial transmission characteristics and/or the like.

Some techniques and apparatuses described herein provide per-PCI configuration for a plurality of RRHs of a base station. For example, the base station may provide respective radio resource control (RRC) configurations for a plurality of PCIs corresponding to the plurality of RRHs. The plurality of RRC configurations may be based at least in part on characteristics of the plurality of RRHs, and may differ from one RRH to the next. For example, an RRC configuration may be specific to an RRH, and may be based at least in part on radio frequency characteristics, measurements, or spatial characteristics of the RRH. In this way, a UE may be configured with a plurality of configurations for respective PCIs and RRHs. The UE may provide measurement information for the RRHs based at least in part on the plurality of configurations, and may receive information indicating a particular PCI or RRH to be used for communication with the base station. The UE and the base station may communicate using configuration information corresponding to the particular PCI or RRH. In this way, RRH-specific configuration is enabled for a base station associated with a plurality of RRHs, thereby improving performance and throughput of the base station and the UE, particularly for deployments involving many RRHs. RRC-specific configuration may be beneficial for inter-cell mobility, such as Layer 1/Layer 2 (L1/L2) centric inter-cell mobility.

Figure 3:
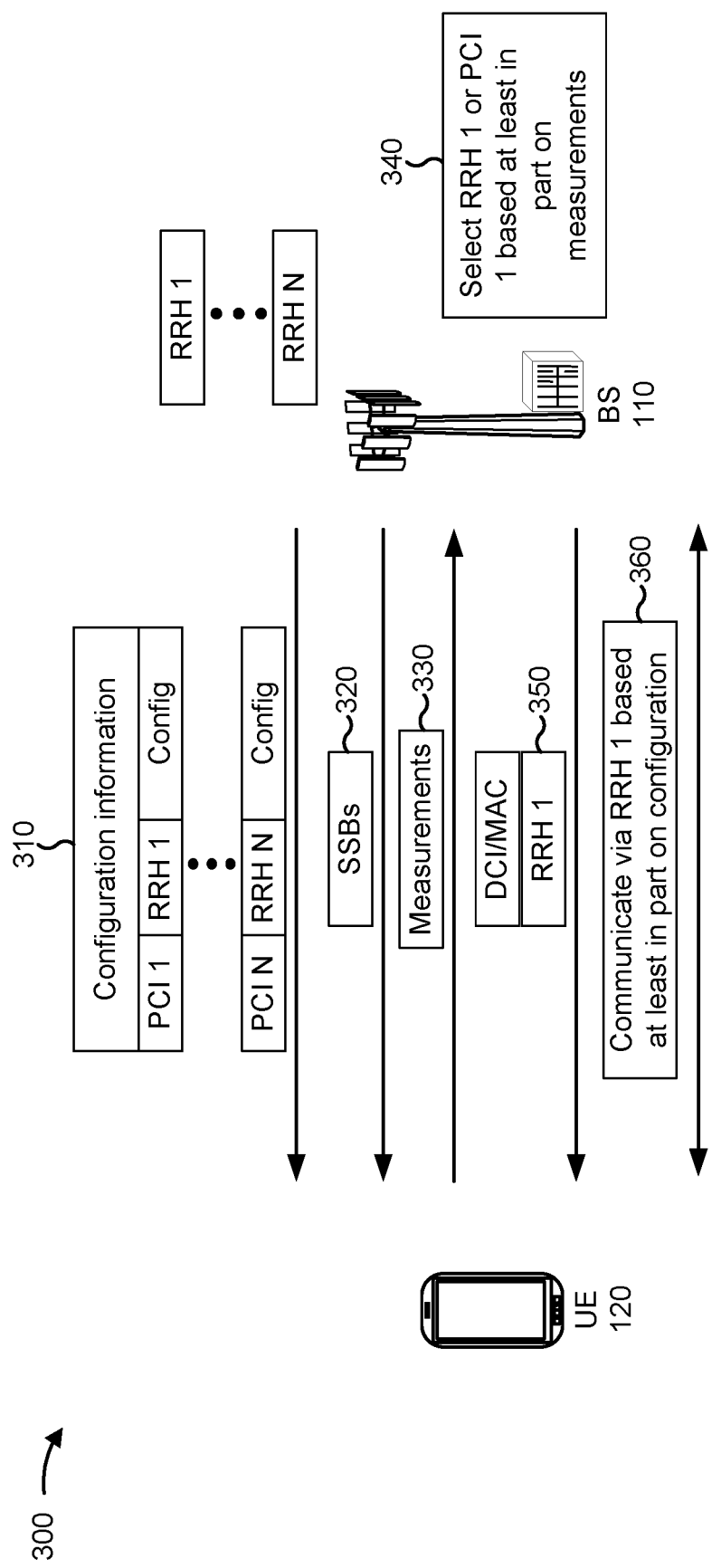
FIG. 3 is a diagram illustrating an example of configuration of a plurality of remote radio heads and physical cell identifiers associated with the plurality of remote radio heads, in accordance with various aspects of the present disclosure.

FIG. 3 is a diagram illustrating an example 300 of configuration of a plurality of remote radio heads and physical cell identifiers associated with the plurality of remote radio heads, in accordance with various aspects of the present disclosure. As shown, example 300 includes a UE 120 and a BS 110. As further shown, the BS 110 is associated with a plurality of RRHs, shown as RRH 1 through RRH N. For example, the BS 110 may manage or configure the plurality of RRHs (e.g., may be a gNB of the plurality of RRHs).

As shown by reference number 310, the BS 110 may provide configuration information for the plurality of RRHs. As shown, each RRH may be associated with a respective PCI, and the configuration information may include respective configurations for each PCI/RRH pairing. In some aspects, the configuration information may be provided via RRC signaling, such as via one or more system information blocks or via dedicated RRC signaling, and/or the like.

The configuration information for an RRH of the BS 110 may identify parameters for measurement or communication between the UE 120 and the RRH. The configuration information may be specified per PCI. Examples of parameters indicated by the configuration are provided below.

In some aspects, the configuration information may identify an SSB configuration, such as an SSB periodicity, an SSB position in a burst, a power level for an SSB, a position of a demodulation reference signal (DMRS), and/or the like. An SSB periodicity may identify a periodicity at which SSBs are transmitted (e.g., 5 ms, 10 ms, 20 ms, 40 ms, 80 ms, 160 ms, or the like). An SSB position in a burst may indicate a time domain position of an SSB in a burst. For example, a first bit in a bitmap may indicate a first SSB (e.g., SS/physical broadcast channel (SS/PBCH)) index, a second bit may indicate a second SSB index, and so on. In some aspects, the configuration may identify a subcarrier spacing for the SSB configuration. A subcarrier spacing indicates a frequency width of subcarriers on the PCI, and can be used to determine a symbol length for the PCI. Thus, the BS 110 may enable per-PCI measurement based at least in part on the SSB configuration and/or the subcarrier spacing, which enables reselection by the UE 120 between PCIs of a single cell, such as a single serving cell provided by the BS 110.

In some aspects, the configuration information may identify a remaining minimum system information (RMSI) or random access configuration for the PCI. For example, the configuration information may indicate a resource of the RMSI, a control resource set configuration for the RMSI (e.g., information indicating a control resource set, in which one or more physical downlink control channel (PDCCH) candidates for the RMSI can be configured), a subcarrier spacing of the RMSI, a random access resource associated with performing random access for the PCI, a random access preamble space indicating a set of random access preambles for the PCI, a type of random access (e.g., two-step versus four-step random access) for the PCI, and/or the like.

In some aspects, the configuration information may identify a rate matching pattern for the PCI. For example, the configuration information may identify one or more reference signals or other resources around which rate matching is to be performed with regard to communications associated with the PCI. In some aspects, the configuration information may indicate a downlink (DL) and/or uplink (UL) time division duplexing (TDD) configuration for the PCI. For example, the configuration information may indicate a pattern of uplink slots, downlink slots, and special slots for a TDD configuration. In some aspects, the configuration information may indicate a supplementary uplink (SUL) configuration for the PCI. For example, the configuration information may indicate a supplementary uplink carrier associated with a downlink/uplink carrier of the PCI. In some aspects, the configuration information may indicate DL and/or UL cell frequency locations, such as center frequencies of one or more cells associated with the PCI. In some aspects, the configuration information may indicate a DL/UL bandwidth part (BWP) configuration, such as a set of BWPs that can be activated, center frequencies of BWPs, bandwidths of BWPs, subcarrier spacings of BWPs, and/or the like, at a per-PCI granularity.

In some aspects, the configuration information may indicate a channel configuration, such as a PDCCH configuration, a physical downlink shared channel (PDSCH) configuration, a physical uplink shared channel (PUSCH) configuration, a physical uplink control channel (PUCCH) configuration, a sounding reference signal (SRS) configuration, and/or the like, for the PCI.

In some aspects, the configuration information may indicate a channel state information (CSI) measurement and/or reporting configuration for a PCI, such as a CSI measurement resource, a CSI reporting resource, a threshold for measurement reporting, and/or the like. In some aspects, the configuration information may indicate a timing advance group (TAG) identifier for a PCI, which may indicate a TAG to which the PCI belongs. A TAG is a group of cells associated with a common timing advance (TA). A TA is a time adjustment applied to uplink transmissions associated with the cell to mitigate propagation delay. In some aspects, the configuration information may indicate a cross-carrier scheduling configuration for a PCI, such as a configuration indicating whether cross-carrier scheduling is enabled for the PCI.

In some aspects, the configuration information may indicate a transmission configuration indicator (TCI) state or a spatial relation configuration for the PCI. For example, the configuration information may indicate a DL TCI state or an UL spatial relation configuration to be used for communications associated with the PCI. In some aspects, the DL TCI state or the UL spatial relation configuration may be based at least in part on a characteristic of the RRH corresponding to the PCI, such as a set of beams usable by the RRH, a transmission direction associated with the RRH, and/or the like.

In some aspects, the configuration information may indicate that a hybrid automatic repeat request (HARQ) process identifier space of a serving cell of the BS 110 is to be duplicated for the plurality of PCIs. This may mean that each PCI can use the full HARQ process identifier space for respective HARQ processes, which may enable more robust HARQ feedback for each PCI. In some aspects, the configuration information may indicate that the HARQ process identifier space is to be divided or split between two or more PCIs, meaning that each PCI of the two or more PCIs can use a proper subset of the HARQ process identifier space. This may reduce overhead and complexity associated with HARQ feedback for each PCI. A HARQ process identifier space of a cell (or PCI) identifies the set of HARQ processes that can be used for communications via the cell (or PCI). Examples of HARQ process identifier spaces include 8 HARQ process identifiers and 16 HARQ process identifiers.

In some aspects, the configuration information may indicate whether beam failure recovery (BFR) or radio link monitoring (RLM) for the serving cell is to be performed on one or more PCIs. For example, in some aspects, BFR or RLM may be performed on all PCIs of the plurality of PCIs, which may improve reliability of the serving cell by increasing the set of possible PCIs for BFR or RLM. In some aspects, BFR or RLM may be performed on a proper subset of PCIs of the plurality of PCIs, which may reduce overhead relative to performing BFR or RLM on all PCIs of the plurality of PCIs. The configuration information may indicate a set of PCIs on which BFR or RLM is to be performed.

In some aspects, the configuration information may indicate that a control resource set (CORESET) identifier space of the serving cell is to be duplicated for the plurality of PCIs. This may mean that each PCI can use the full CORESET identifier space, which increases flexibility of CORESET scheduling. In some aspects, the configuration information may indicate that the CORESET identifier space is to be divided or split between two or more PCIs, meaning that each PCI of the two or more PCIs can use a proper subset of the CORESET identifier space. This may reduce overhead and complexity associated with HARQ feedback for each PCI. When the CORESET identifier space is split across two or more PCIs, each CORESET identifier may be associated with a corresponding PCI index or a corresponding SSB set index, where the corresponding SSB set index is associated with one or more PCIs.

In some aspects, the configuration information may indicate an initial downlink BWP, one or more downlink BWPs to release or add, a first active downlink BWP, and/or a BWP inactivity timer for a BWP associated with the PCI. In some aspects, the configuration information may indicate a secondary cell deactivation timer for the PCI, which may indicate a length of time after which the UE 120 is to deactivate or release a secondary cell if no communication is performed on the secondary cell in the length of time. In some aspects, the configuration information may indicate a pathloss reference signal linking configuration, which may indicate a relationship between a special cell (e.g., a primary cell or a primary secondary cell) and a secondary cell such that the UE can determine a pathloss value for the secondary cell based at least in part on a pathloss reference signal associated with the primary cell. In some aspects, the serving cell configuration may indicate a timing advance offset, which indicates a timing advance to be applied for uplink communications associated with the PCI.

As shown by reference number 320, the BS 110 may transmit a plurality of SSBs using the plurality of RRHs. For example, the BS 110 may transmit the plurality of SSBs in accordance with respective SSB configurations of the plurality of RRHs. As shown by reference number 330, the UE 120 may transmit measurement information regarding the plurality of SSBs to the BS 110. For example, the UE 120 may perform measurements of the plurality of SSBs in accordance with measurement configurations indicated by the configuration information. The UE 120 may provide the measurement information to the BS 110 so that the BS 110 can select an appropriate RRH for communication with the UE 120. The measurement information may indicate, for example, reference signal received power (RSRP) values for the plurality of SSBs.

As shown by reference number 340, the BS 110 may select a PCI or an RRH for communication with the UE 120 based at least in part on the measurement information. Here, the BS 110 selects RRH 1. For example, the BS 110 may select RRH 1 based at least in part on the measurement information for RRH 1 satisfying a threshold relative to measurement information associated with other RRHs, based at least in part on load balancing concerns, and/or the like.

As shown by reference number 350, the BS 110 may transmit an indication of a particular RRH or PCI that the UE 120 is to use to communicate with the BS 110. In some aspects, the BS 110 may transmit the indication using downlink control information (DCI), a medium access control (MAC) control element (CE), and/or the like. Here, the particular RRH or PCI is RRH 1, corresponding to PCI 1, as selected by the BS 110.

As shown by reference number 360, the UE 120 and the BS 110 may communicate via RRH 1 based at least in part on the configuration corresponding to RRH 1. For example, the UE 120 may connect to the serving cell provided by the BS 110 via RRH 1. In some aspects, the UE 120 may perform a random access procedure with regard to RRH 1 or PCI 1, for example, in accordance with the configuration information. In some aspects, the UE 120 may perform an intra-cell, inter-PCI switching procedure to switch from another PCI or RRH provided by the BS 110 to the RRH 1 and/or the PCI 1, such as an L1/L2 centric intra-cell mobility operation.

As indicated above, FIG. 3 is provided as an example. Other examples may differ from what is described with respect to FIG. 3.

Figure 4:
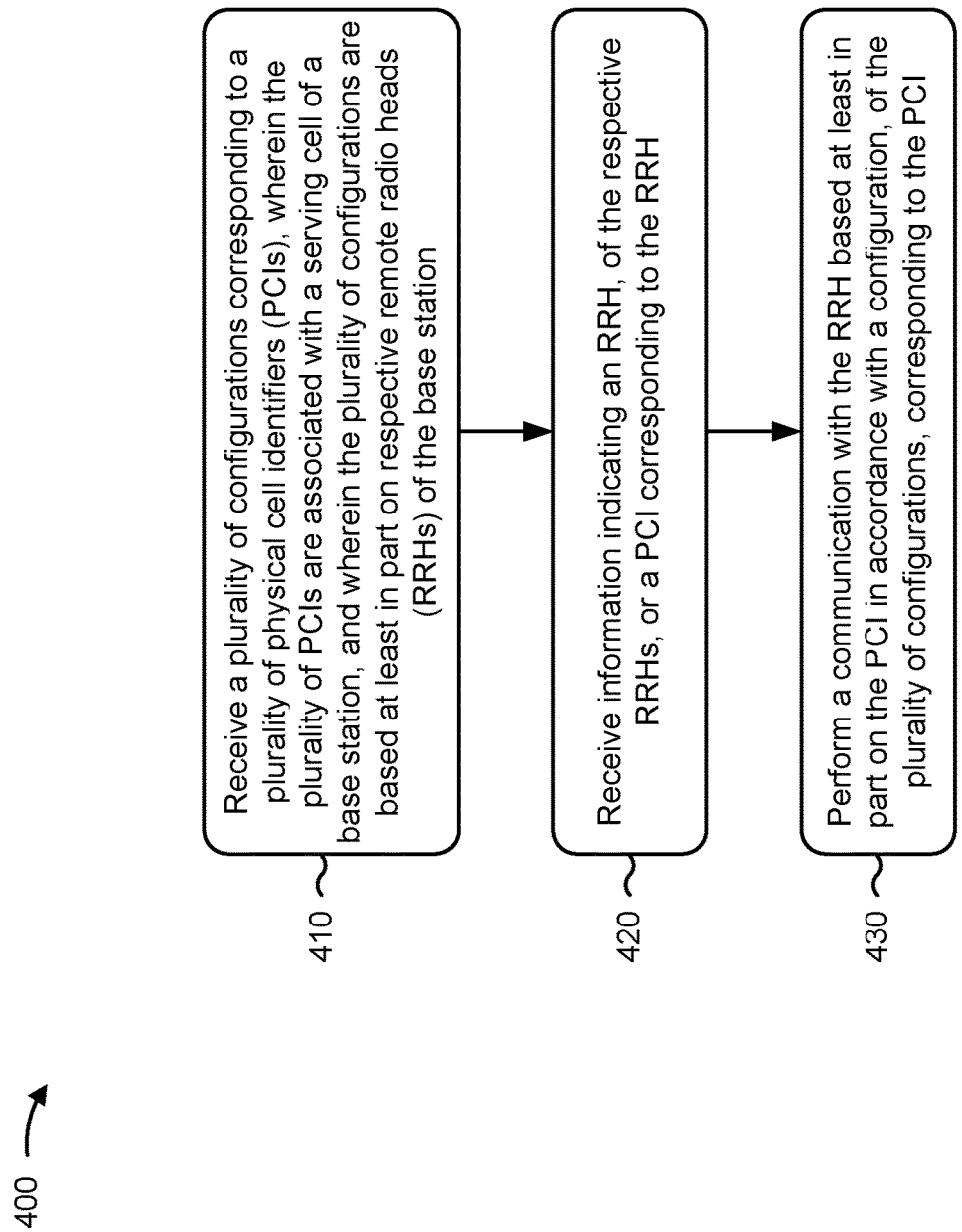
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with per-PCI configuration of a set of RRHs.

As shown in FIG. 4, in some aspects, process 400 may include receiving a plurality of configurations corresponding to a plurality of PCIs, wherein the plurality of PCIs are associated with a serving cell of a base station, and wherein the plurality of configurations are based at least in part on respective RRHs of the base station (block 410). For example, the UE (e.g., using antenna 252, DEMOD 254, MIMO detector 256, receive processor 258, controller/processor 280, and/or the like) may receive a plurality of configurations corresponding to a plurality of PCIs, as described above. In some aspects, the plurality of PCIs are associated with a serving cell of a base station. In some aspects, the plurality of configurations are based at least in part on respective RRHs of the base station.

As further shown in FIG. 4, in some aspects, process 400 may include receiving information indicating an RRH, of the respective RRHs, or a PCI corresponding to the RRH (block 420). For example, the UE (e.g., using antenna 252, DEMOD 254, MIMO detector 256, receive processor 258, controller/processor 280, and/or the like) may receive information indicating an RRH, of the respective RRHs, or a PCI corresponding to the RRH, as described above.

As further shown in FIG. 4, in some aspects, process 400 may include performing a communication with the RRH based at least in part on the PCI in accordance with a configuration, of the plurality of configurations, corresponding to the PCI (block 430). For example, the UE (e.g., using controller/processor 280, transmit processor 264, TX MIMO processor 266, MOD 254, antenna 252, and/or the like) may perform a communication with the RRH based at least in part on the PCI in accordance with a configuration, of the plurality of configurations, corresponding to the PCI, as described above.

Process 400 may include additional aspects, such as any single aspect or any combination of aspects described below and/or in connection with one or more other processes described elsewhere herein.

In a first aspect, the plurality of PCIs correspond to the respective RRHs.

In a second aspect, alone or in combination with the first aspect, process 400 includes receiving one or more synchronization signal blocks from the RRH based at least in part on the configuration, and reporting a measurement based at least in part on the one or more synchronization signal blocks wherein the information indicating the RRH is being based at least in part on the measurement.

In a third aspect, alone or in combination with one or more of the first and second aspects, the plurality of configurations indicate synchronization signal block configurations of the plurality of PCIs.

In a fourth aspect, alone or in combination with one or more of the first through third aspects, the plurality of configurations indicate subcarrier spacings of the plurality of PCIs.

In a fifth aspect, alone or in combination with one or more of the first through fourth aspects, the plurality of configurations indicate remaining minimum system information or random access configurations of the plurality of PCIs.

In a sixth aspect, alone or in combination with one or more of the first through fifth aspects, the plurality of configurations indicate rate matching patterns of the plurality of PCIs.

In a seventh aspect, alone or in combination with one or more of the first through sixth aspects, the plurality of configurations indicate time division duplexing configurations of the plurality of PCIs.

In an eighth aspect, alone or in combination with one or more of the first through seventh aspects, the plurality of configurations indicate supplementary uplink configurations of the plurality of PCIs.

In a ninth aspect, alone or in combination with one or more of the first through eighth aspects, the plurality of configurations indicate cell frequency locations of the plurality of PCIs.

In a tenth aspect, alone or in combination with one or more of the first through ninth aspects, the plurality of configurations indicate bandwidth part configurations of the plurality of PCIs.

In an eleventh aspect, alone or in combination with one or more of the first through tenth aspects, the plurality of configurations indicate at least one of data channel configurations, control channel configurations, or reference signal configurations of the plurality of PCIs.

In a twelfth aspect, alone or in combination with one or more of the first through eleventh aspects, the plurality of configurations indicate at least one of channel state information measurement configurations or reporting configurations of the plurality of PCIs.

In a thirteenth aspect, alone or in combination with one or more of the first through twelfth aspects, the plurality of configurations indicate timing advance group identifiers of the plurality of PCIs.

In a fourteenth aspect, alone or in combination with one or more of the first through thirteenth aspects, the plurality of configurations indicate cross-carrier scheduling configurations of the plurality of PCIs.

In a fifteenth aspect, alone or in combination with one or more of the first through fourteenth aspects, the plurality of configurations indicate transmission configuration indicator states or spatial relation configurations of the plurality of PCIs.

In a sixteenth aspect, alone or in combination with one or more of the first through fifteenth aspects, a hybrid automatic repeat request (HARQ) process identifier space of the serving cell is duplicated for two or more PCIs of the plurality of PCIs.

In a seventeenth aspect, alone or in combination with one or more of the first through sixteenth aspects, a first PCI of the plurality of PCIs is associated with a first part of a HARQ process identifier space of the serving cell, and a second PCI of the plurality of PCIs is associated with a second part of the HARQ process identifier space of the serving cell.

In an eighteenth aspect, alone or in combination with one or more of the first through seventeenth aspects, process 400 includes performing a radio link monitoring operation or a beam failure recovery operation for all PCIs of the plurality of PCIs based at least in part on the plurality of configurations.

In a nineteenth aspect, alone or in combination with one or more of the first through eighteenth aspects, process 400 includes performing a radio link monitoring operation or a beam failure recovery operation for a proper subset of the plurality of PCIs based at least in part on the plurality of configurations.

In a twentieth aspect, alone or in combination with one or more of the first through nineteenth aspects, a control resource set identifier space of the serving cell is duplicated for two or more PCIs of the plurality of PCIs.

In a twenty-first aspect, alone or in combination with one or more of the first through twentieth aspects, a control resource set identifier space of the serving cell is divided among two or more PCIs of the plurality of PCIs.

In a twenty-second aspect, alone or in combination with one or more of the first through twenty-first aspects, one or more control resource set identifiers, of the control resource set identifier space, are associated with one or more respective PCI indexes or one or more respective SSB set indexes.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with various aspects of the present disclosure. Example process 500 is an example where the base station (e.g., BS 110 and/or the like) performs operations associated with per-PCI configuration for a set of RRHs.

As shown in FIG. 5, in some aspects, process 500 may include transmitting, to a UE, a plurality of configurations corresponding to a plurality of PCIs, wherein the plurality of PCIs are associated with a serving cell, and wherein the plurality of configurations are based at least in part on respective RRHs associated with the serving cell (block 510). For example, the base station (e.g., using controller/processor 240, transmit processor 220, TX MIMO processor 230, MOD 232, antenna 234, and/or the like) may transmit, to a UE, a plurality of configurations corresponding to a plurality of PCIs, as described above. In some aspects, the plurality of PCIs are associated with a serving cell. In some aspects, the plurality of configurations are based at least in part on respective RRHs associated with the serving cell.

As further shown in FIG. 5, in some aspects, process 500 may include transmitting information indicating an RRH, of the respective RRHs, or a PCI corresponding to the RRH (block 520). For example, the base station (e.g., using controller/processor 240, transmit processor 220, TX MIMO processor 230, MOD 232, antenna 234, and/or the like) may transmit information indicating an RRH, of the respective RRHs, or a PCI corresponding to the RRH, as described above.

As further shown in FIG. 5, in some aspects, process 500 may include performing a communication using the RRH based at least in part on the PCI in accordance with a configuration, of the plurality of configurations, corresponding to the PCI (block 530). For example, the base station (e.g., using antenna 234, DEMOD 232, MIMO detector 236, receive processor 238, controller/processor 240, and/or the like) may perform a communication using the RRH based at least in part on the PCI in accordance with a configuration, of the plurality of configurations, corresponding to the PCI, as described above.

Process 500 may include additional aspects, such as any single aspect or any combination of aspects described below and/or in connection with one or more other processes described elsewhere herein.

In a first aspect, the plurality of PCIs correspond to the respective RRHs.

In a second aspect, alone or in combination with the first aspect, process 500 includes transmitting respective synchronization signal blocks from the respective RRHs based at least in part on the plurality of configurations; receiving information indicating one or more measurements based at least in part on the respective synchronization signal blocks; selecting the RRH or the PCI based at least in part on the information indicating the one or more measurements; and transmitting the information indicating the RRH based at least in part on selecting the RRH or the PCI.

In a third aspect, alone or in combination with one or more of the first and second aspects, the plurality of configurations indicate synchronization signal block configurations of the plurality of PCIs.

In a fourth aspect, alone or in combination with one or more of the first through third aspects, the plurality of configurations indicate subcarrier spacings of the plurality of PCIs.

In a fifth aspect, alone or in combination with one or more of the first through fourth aspects, the plurality of configurations indicate remaining minimum system information or random access configurations of the plurality of PCIs.

In a sixth aspect, alone or in combination with one or more of the first through fifth aspects, the plurality of configurations indicate rate matching patterns of the plurality of PCIs.

In a seventh aspect, alone or in combination with one or more of the first through sixth aspects, the plurality of configurations indicate time division duplexing configurations of the plurality of PCIs.

In an eighth aspect, alone or in combination with one or more of the first through seventh aspects, the plurality of configurations indicate supplementary uplink configurations of the plurality of PCIs.

In a ninth aspect, alone or in combination with one or more of the first through eighth aspects, the plurality of configurations indicate cell frequency locations of the plurality of PCIs.

In a tenth aspect, alone or in combination with one or more of the first through ninth aspects, the plurality of configurations indicate bandwidth part configurations of the plurality of PCIs.

In an eleventh aspect, alone or in combination with one or more of the first through tenth aspects, the plurality of configurations indicate at least one of data channel configurations, control channel configurations, or reference signal configurations of the plurality of PCIs.

In a twelfth aspect, alone or in combination with one or more of the first through eleventh aspects, the plurality of configurations indicate at least one of channel state information measurement configurations or reporting configurations of the plurality of PCIs.

In a thirteenth aspect, alone or in combination with one or more of the first through twelfth aspects, the plurality of configurations indicate timing advance group identifiers of the plurality of PCIs.

In a fourteenth aspect, alone or in combination with one or more of the first through thirteenth aspects, the plurality of configurations indicate cross-carrier scheduling configurations of the plurality of PCIs.

In a fifteenth aspect, alone or in combination with one or more of the first through fourteenth aspects, the plurality of configurations indicate transmission configuration indicator states or spatial relation configurations of the plurality of PCIs.

In a sixteenth aspect, alone or in combination with one or more of the first through fifteenth aspects, a HARQ process identifier space of the serving cell is duplicated for two or more PCIs of the plurality of PCIs.

In a seventeenth aspect, alone or in combination with one or more of the first through sixteenth aspects, a first PCI of the plurality of PCIs is associated with a first part of a HARQ process identifier space of the serving cell, and a second PCI of the plurality of PCIs is associated with a second part of the HARQ process identifier space of the serving cell.

In an eighteenth aspect, alone or in combination with one or more of the first through seventeenth aspects, a control resource set identifier space of the serving cell is duplicated for two or more PCIs of the plurality of PCIs.

In a nineteenth aspect, alone or in combination with one or more of the first through eighteenth aspects, a control resource set identifier space of the serving cell is divided among two or more PCIs of the plurality of PCIs.

In a twentieth aspect, alone or in combination with one or more of the first through nineteenth aspects, one or more control resource set identifiers, of the control resource set identifier space, are associated with one or more respective PCI indexes or one or more respective SSB set indexes.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: receiving a plurality of configurations corresponding to a plurality of physical cell identifiers (PCIs), wherein the plurality of PCIs are associated with a serving cell of a base station, and wherein the plurality of configurations are based at least in part on respective remote radio heads (RRHs) of the base station; receiving information indicating an RRH, of the respective RRHs, or a PCI corresponding to the RRH; and performing a communication with the RRH based at least in part on the PCI in accordance with a configuration, of the plurality of configurations, corresponding to the PCI.

Aspect 2: The method of aspect 1, wherein the plurality of PCIs correspond to the respective RRHs.

Aspect 3: The method of aspect 1, further comprising: receiving one or more synchronization signal blocks from the RRH based at least in part on the configuration; and reporting a measurement based at least in part on the one or more synchronization signal blocks, wherein the information indicating the RRH is based at least in part on the measurement.

Aspect 4: The method of aspect 1, wherein the plurality of configurations indicate synchronization signal block configurations of the plurality of PCIs.

Aspect 5: The method of aspect 1, wherein the plurality of configurations indicate subcarrier spacings of the plurality of PCIs.

Aspect 6: The method of aspect 1, wherein the plurality of configurations indicate remaining minimum system information or random access configurations of the plurality of PCIs.

Aspect 7: The method of aspect 1, wherein the plurality of configurations indicate rate matching patterns of the plurality of PCIs.

Aspect 8: The method of aspect 1, wherein the plurality of configurations indicate time division duplexing configurations of the plurality of PCIs.

Aspect 9: The method of aspect 1, wherein the plurality of configurations indicate supplementary uplink configurations of the plurality of PCIs.

Aspect 10: The method of aspect 1, wherein the plurality of configurations indicate cell frequency locations of the plurality of PCIs.

Aspect 11: The method of aspect 1, wherein the plurality of configurations indicate bandwidth part configurations of the plurality of PCIs.

Aspect 12: The method of aspect 1, wherein the plurality of configurations indicate at least one of data channel configurations, control channel configurations, or reference signal configurations of the plurality of PCIs.

Aspect 13: The method of aspect 1, wherein the plurality of configurations indicate at least one of channel state information measurement configurations or reporting configurations of the plurality of PCIs.

Aspect 14: The method of aspect 1, wherein the plurality of configurations indicate timing advance group identifiers of the plurality of PCIs.

Aspect 15: The method of aspect 1, wherein the plurality of configurations indicate cross-carrier scheduling configurations of the plurality of PCIs.

Aspect 16: The method of aspect 1, wherein the plurality of configurations indicate transmission configuration indicator states or spatial relation configurations of the plurality of PCIs.

Aspect 17: The method of aspect 1, wherein a hybrid automatic repeat request (HARQ) process identifier space of the serving cell is duplicated for two or more PCIs of the plurality of PCIs.

Aspect 18: The method of aspect 1, wherein a first PCI of the plurality of PCIs is associated with a first part of a hybrid automatic repeat request (HARQ) process identifier space of the serving cell, and a second PCI of the plurality of PCIs is associated with a second part of the HARQ process identifier space of the serving cell.

Aspect 19: The method of aspect 1, further comprising: performing a radio link monitoring operation or a beam failure recovery operation for all PCIs of the plurality of PCIs based at least in part on the plurality of configurations.

Aspect 20: The method of aspect 1, further comprising: performing a radio link monitoring operation or a beam failure recovery operation for a proper subset of the plurality of PCIs based at least in part on the plurality of configurations.

Aspect 21: The method of aspect 1, wherein a control resource set identifier space of the serving cell is duplicated for two or more PCIs of the plurality of PCIs.

Aspect 22: The method of aspect 1, wherein a control resource set identifier space of the serving cell is divided among two or more PCIs of the plurality of PCIs.

Aspect 23: The method of aspect 22, wherein one or more control resource set identifiers, of the control resource set identifier space, are associated with one or more respective PCI indexes or one or more respective SSB set indexes.

Aspect 24: A method of wireless communication performed by a base station, comprising: transmitting, to a user equipment (UE), a plurality of configurations corresponding to a plurality of physical cell identifiers (PCIs), wherein the plurality of PCIs are associated with a serving cell, and wherein the plurality of configurations are based at least in part on respective remote radio heads (RRHs) associated with the serving cell; transmitting information indicating an RRH, of the respective RRHs, or a PCI corresponding to the RRH; and performing a communication using the RRH based at least in part on the PCI in accordance with a configuration, of the plurality of configurations, corresponding to the PCI.

Aspect 25: The method of aspect 24, wherein the plurality of PCIs correspond to the respective RRHs.

Aspect 26: The method of aspect 24, further comprising: transmitting respective synchronization signal blocks from the respective RRHs based at least in part on the plurality of configurations; receiving information indicating one or more measurements based at least in part on the respective synchronization signal blocks; selecting the RRH or the PCI based at least in part on the information indicating the one or more measurements; and transmitting the information indicating the RRH based at least in part on selecting the RRH or the PCI.

Aspect 27: The method of aspect 24, wherein the plurality of configurations indicate synchronization signal block configurations of the plurality of PCIs.

Aspect 28: The method of aspect 24, wherein the plurality of configurations indicate subcarrier spacings of the plurality of PCIs.

Aspect 29: The method of aspect 24, wherein the plurality of configurations indicate remaining minimum system information or random access configurations of the plurality of PCIs.

Aspect 30: The method of aspect 24, wherein the plurality of configurations indicate rate matching patterns of the plurality of PCIs.

Aspect 31: The method of aspect 24, wherein the plurality of configurations indicate time division duplexing configurations of the plurality of PCIs.

Aspect 32: The method of aspect 24, wherein the plurality of configurations indicate supplementary uplink configurations of the plurality of PCIs.

Aspect 33: The method of aspect 24, wherein the plurality of configurations indicate cell frequency locations of the plurality of PCIs.

Aspect 34: The method of aspect 24, wherein the plurality of configurations indicate bandwidth part configurations of the plurality of PCIs.

Aspect 35: The method of aspect 24, wherein the plurality of configurations indicate at least one of data channel configurations, control channel configurations, or reference signal configurations of the plurality of PCIs.

Aspect 36: The method of aspect 24, wherein the plurality of configurations indicate at least one of channel state information measurement configurations or reporting configurations of the plurality of PCIs.

Aspect 37: The method of aspect 24, wherein the plurality of configurations indicate timing advance group identifiers of the plurality of PCIs.

Aspect 38: The method of aspect 24, wherein the plurality of configurations indicate cross-carrier scheduling configurations of the plurality of PCIs.

Aspect 39: The method of aspect 24, wherein the plurality of configurations indicate transmission configuration indicator states or spatial relation configurations of the plurality of PCIs.

Aspect 40: The method of aspect 24, wherein a hybrid automatic repeat request (HARQ) process identifier space of the serving cell is duplicated for two or more PCIs of the plurality of PCIs.

Aspect 41: The method of aspect 24, wherein a first PCI of the plurality of PCIs is associated with a first part of a hybrid automatic repeat request (HARQ) process identifier space of the serving cell, and a second PCI of the plurality of PCIs is associated with a second part of the HARQ process identifier space of the serving cell.

Aspect 42: The method of aspect 24, wherein a control resource set identifier space of the serving cell is duplicated for two or more PCIs of the plurality of PCIs.

Aspect 43: The method of aspect 24, wherein a control resource set identifier space of the serving cell is divided among two or more PCIs of the plurality of PCIs.

Aspect 44: The method of aspect 43, wherein one or more control resource set identifiers, of the control resource set identifier space, are associated with one or more respective PCI indexes or one or more respective SSB set indexes.

Aspect 45: An apparatus for wireless communication at a device, comprising a processor; memory coupled with the processor; and instructions stored in the memory and executable by the processor to cause the apparatus to perform the method of one or more aspects of aspects 1-44.

Aspect 46: A device for wireless communication, comprising a memory and one or more processors coupled to the memory, the memory and the one or more processors configured to perform the method of one or more aspects of aspects 1-44.

Aspect 47: An apparatus for wireless communication, comprising at least one means for performing the method of one or more aspects of aspects 1-44.

Aspect 48: A non-transitory computer-readable medium storing code for wireless communication, the code comprising instructions executable by a processor to perform the method of one or more aspects of aspects 1-44.

Aspect 49: A non-transitory computer-readable medium storing a set of instructions for wireless communication, the set of instructions comprising one or more instructions that, when executed by one or more processors of a device, cause the device to perform the method of one or more aspects of aspects 1-44.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors operatively coupled to the memory, the memory and the one or more processors configured to:
   receive a plurality of configurations corresponding to a plurality of physical cell identifiers (PCIs), wherein the plurality of PCIs are associated with a serving cell of a base station, and wherein the plurality of configurations are based at least in part on respective remote radio heads (RRHs) of the base station and indicate synchronization signal block configurations of the plurality of PCIs;
   receive information indicating an RRH, of the respective RRHs, or a PCI corresponding to the RRH; and
   perform a communication with the RRH based at least in part on the PCI in accordance with a configuration, of the plurality of configurations, corresponding to the PCI.

2. The UE of claim 1, wherein the plurality of PCIs correspond to the respective RRHs.

3. The UE of claim 1, wherein the one or more processors are further configured to:
   receive one or more synchronization signal blocks from the RRH based at least in part on the configuration; and
   report a measurement based at least in part on the one or more synchronization signal blocks, wherein the information indicating the RRH is based at least in part on the measurement.

4. The UE of claim 1, wherein the plurality of configurations indicate subcarrier spacings of the plurality of PCIs.

5. The UE of claim 1, wherein the plurality of configurations indicate remaining minimum system information or random access configurations of the plurality of PCIs.

6. The UE of claim 1, wherein the plurality of configurations indicate rate matching patterns of the plurality of PCIs.

7. The UE of claim 1, wherein the plurality of configurations indicate time division duplexing configurations of the plurality of PCIs.

8. The UE of claim 1, wherein the plurality of configurations indicate supplementary uplink configurations of the plurality of PCIs.

9. The UE of claim 1, wherein the plurality of configurations indicate cell frequency locations of the plurality of PCIs.

10. The UE of claim 1, wherein the plurality of configurations indicate bandwidth part configurations of the plurality of PCIs.

11. The UE of claim 1, wherein the plurality of configurations indicate at least one of data channel configurations, control channel configurations, or reference signal configurations of the plurality of PCIs.

12. The UE of claim 1, wherein the plurality of configurations indicate at least one of channel state information measurement configurations or reporting configurations of the plurality of PCIs.

13. The UE of claim 1, wherein the plurality of configurations indicate timing advance group identifiers of the plurality of PCIs.

14. The UE of claim 1, wherein the plurality of configurations indicate cross-carrier scheduling configurations of the plurality of PCIs.

15. The UE of claim 1, wherein the plurality of configurations indicate transmission configuration indicator states or spatial relation configurations of the plurality of PCIs.

16. The UE of claim 1, wherein a hybrid automatic repeat request (HARQ) process identifier space of the serving cell is duplicated for two or more PCIs of the plurality of PCIs.

17. The UE of claim 1, wherein a first PCI of the plurality of PCIs is associated with a first part of a hybrid automatic repeat request (HARQ) process identifier space of the serving cell, and a second PCI of the plurality of PCIs is associated with a second part of the HARQ process identifier space of the serving cell.

18. The UE of claim 1, wherein the one or more processors are further configured to:
perform a radio link monitoring operation or a beam failure recovery operation for all PCIs of the plurality of PCIs based at least in part on the plurality of configurations.

19. The UE of claim 1, wherein the one or more processors are further configured to:
perform a radio link monitoring operation or a beam failure recovery operation for a proper subset of the plurality of PCIs based at least in part on the plurality of configurations.

20. The UE of claim 1, wherein a control resource set identifier space of the serving cell is duplicated for two or more PCIs of the plurality of PCIs.

21. The UE of claim 1, wherein a control resource set identifier space of the serving cell is divided among two or more PCIs of the plurality of PCIs.

22. The UE of claim 21, wherein one or more control resource set identifiers, of the control resource set identifier space, are associated with one or more respective PCI indexes or one or more respective SSB set indexes.

23. A base station for wireless communication, comprising:
a memory; and one or more processors operatively coupled to the memory, the memory and the one or more processors configured to:
transmit, to a user equipment (UE), a plurality of configurations corresponding to a plurality of physical cell identifiers (PCIs), wherein the plurality of PCIs are associated with a serving cell, and wherein the plurality of configurations are based at least in part on respective remote radio heads (RRHs) associated with the serving cell and indicate synchronization signal block configurations of the plurality of PCIs;
transmit information indicating an RRH, of the respective RRHs, or a PCI corresponding to the RRH; and
perform a communication using the RRH based at least in part on the PCI in accordance with a configuration, of the plurality of configurations, corresponding to the PCI.

24. The base station of claim 23, wherein the plurality of PCIs correspond to the respective RRHs.

25. The base station of claim 23, wherein the one or more processors are further configured to:
transmit respective synchronization signal blocks from the respective RRHs based at least in part on the plurality of configurations;
receive information indicating one or more measurements based at least in part on the respective synchronization signal blocks;
select the RRH or the PCI based at least in part on the information indicating the one or more measurements; and
transmit the information indicating the RRH based at least in part on selecting the RRH or the PCI.

26. The base station of claim 23, wherein a hybrid automatic repeat request (HARQ) process identifier space of the serving cell is duplicated for two or more PCIs of the plurality of PCIs.

27. The base station of claim 23, wherein a first PCI of the plurality of PCIs is associated with a first part of a hybrid automatic repeat request (HARQ) process identifier space of the serving cell, and a second PCI of the plurality of PCIs is associated with a second part of the HARQ process identifier space of the serving cell.

28. A method of wireless communication performed by a user equipment (UE), comprising:
receiving a plurality of configurations corresponding to a plurality of physical cell identifiers (PCIs), wherein the plurality of PCIs are associated with a serving cell of a base station, and wherein the plurality of configurations are based at least in part on respective remote radio heads (RRHs) of the base station and indicate synchronization signal block configurations of the plurality of PCIs;
receiving information indicating an RRH, of the respective RRHs, or a PCI corresponding to the RRH; and
performing a communication with the RRH based at least in part on the PCI in accordance with a configuration, of the plurality of configurations, corresponding to the PCI.

29. A method of wireless communication performed by a base station, comprising:
transmitting, to a user equipment (UE), a plurality of configurations corresponding to a plurality of physical cell identifiers (PCIs), wherein the plurality of PCIs are associated with a serving cell, and wherein the plurality of configurations are based at least in part on respective remote radio heads (RRHs) associated with the serving cell and indicate synchronization signal block configurations of the plurality of PCIs;
transmitting information indicating an RRH, of the respective RRHs, or a PCI corresponding to the RRH; and
performing a communication using the RRH based at least in part on the PCI in accordance with a configuration, of the plurality of configurations, corresponding to the PCI.

* * * * *